(12) United States Patent
Kommula et al.

(10) Patent No.: US 12,489,699 B1
(45) Date of Patent: Dec. 2, 2025

(54) METHODS AND APPARATUS FOR EFFICIENT STORAGE AND QUERYING OF COMMUNICATION NETWORK PARAMETERS

(71) Applicant: Selector Software, Inc., Santa Clara, CA (US)

(72) Inventors: Sunanda Kommula, Cupertino, CA (US); Sirish A. Kondi, Milpitas, CA (US); Santosh Pallagatti Kotrabasappa, Bengaluru (IN)

(73) Assignee: SELECTOR SOFTWARE, INC., Santa Clara, CA (US)

( * ) Notice: Subject to any disclaimer, the term of this patent is extended or adjusted under 35 U.S.C. 154(b) by 0 days.

(21) Appl. No.: 18/785,492

(22) Filed: Jul. 26, 2024

(51) Int. Cl.
*H04L 45/02* (2022.01)
*H04L 45/80* (2022.01)

(52) U.S. Cl.
CPC .............. *H04L 45/02* (2013.01); *H04L 45/80* (2022.05)

(58) Field of Classification Search
CPC ................................ H04L 45/02; H04L 45/80
USPC ......................................................... 709/238
See application file for complete search history.

(56) References Cited

U.S. PATENT DOCUMENTS

| 10,469,360 | B1 | 11/2019 | Bhat | |
| 2005/0201380 | A1* | 9/2005 | Saleh | H04J 14/0295 |
| | | | | 370/254 |
| 2007/0258454 | A1* | 11/2007 | Wijnands | H04L 12/18 |
| | | | | 370/390 |
| 2012/0020364 | A1* | 1/2012 | Zinjuwadia | H04L 45/745 |
| | | | | 370/401 |
| 2015/0110002 | A1* | 4/2015 | Wilkinson | H04W 40/02 |
| | | | | 370/329 |
| 2016/0248658 | A1* | 8/2016 | Patel | H04L 45/488 |
| 2017/0099180 | A1 | 4/2017 | Singh | |
| 2021/0176165 | A1* | 6/2021 | Vairavakkalai | H04L 45/26 |
| 2022/0272023 | A1 | 8/2022 | Bidgoli | |
| 2023/0059537 | A1* | 2/2023 | Gavand | H04L 67/1006 |
| 2025/0062990 | A1* | 2/2025 | Srinivasan | H04L 45/64 |
| 2025/0112866 | A1* | 4/2025 | Luke | H04L 45/7453 |

FOREIGN PATENT DOCUMENTS

WO    WO-2006081138 A1 *  8/2006  ............. H04L 45/02

OTHER PUBLICATIONS

Written Opinion of the International Searching Authority mailed Oct. 18, 2024, in International Application No. PCT/US24/39744.
International Search Report mailed Oct. 18, 2024, in International Application No. PCT/ US24/39744.
U.S. Appl. No. 18/600,223, filed Mar. 8, 2024. (Available in Patent Center).
U.S. Appl. No. 18/434,963, filed Feb. 7, 2024. (Available in Patent Center).

* cited by examiner

*Primary Examiner* — Anthony Mejia
(74) *Attorney, Agent, or Firm* — FisherBroyles LLP

(57) ABSTRACT

This disclosure pertains to computer-assisted methods, apparatus, and systems for efficiently monitoring and storing the state of large-scale communication networks and tracing packet routes through such networks.

18 Claims, 7 Drawing Sheets

Matching Prefix List Query Result

| Prefix | Length | Nexthop | RR list |
|---|---|---|---|
| 8.8.8.0/24 | 24 | nh-1 | RR1, RR2, RR3, RR4 |
| 8.8.8.0/16 | 16 | nh-2 | RR2, RR3, RR5, RR7, RR8 |
| 8.0.0.0/12 | 12 | nh-3 | RR1, RR4, RR5, RR7 |
| 8.0.0.0/9 | 9 | nh-1 | RR1, RR2, RR3, RR4 |
| 8.0.0.0/8 | 8 | nh-2 | RR2, RR3, RR5, RR7, RR8 |
| 0.0.0.0/0 | 0 | nh-3 | RR1, RR4, RR5, RR7 |
| 8.8.8.0/24 | 24 | nh-11 | RR11, RR12, RR13, RR14 |
| 8.8.0.0/16 | 16 | nh-12 | RR12, RR13, RR15, RR17, RR18 |
| 8.0.0.0/12 | 12 | nh-13 | RR11, RR14, RR15, RR17 |
| 8.0.0.0/9 | 9 | nh-11 | RR11, RR12, RR13, RR14 |
| 8.0.0.0/8 | 8 | nh-12 | RR12, RR13, RR15, RR17, RR18 |
| 0.0.0.0/0 | 0 | nh-13 | RR11, RR14, RR15, RR17 |
| 8.8.8.0/24 | 24 | nh-21 | RR21, RR22, RR23, RR24 |
| 8.8.0.0/16 | 16 | nh-22 | RR22, RR23, RR25, RR27, RR28 |
| 8.0.0.0/12 | 12 | nh-23 | RR21, RR24, RR25, RR27 |
| 8.0.0.0/9 | 9 | nh-21 | RR21, RR22, RR23, RR24 |
| 8.0.0.0/8 | 8 | nh-22 | RR22, RR23, RR25, RR27, RR28 |
| 0.0.0.0/0 | 0 | nh-23 | RR21, RR24, RR25, RR27 |
| ... | | ... | ... |

FIG. 6

Matching Prefixes Sorted by Prefix-Length

| Prefix | Length | Nexthop | RR list |
|---|---|---|---|
| 8.8.8.0/24 | 24 | nh-1 | RR1, RR2, RR3, RR4 |
| 8.8.8.0/24 | 24 | nh-11 | RR11, RR12, RR13, RR14 |
| 8.8.8.0/24 | 24 | nh-21 | RR21, RR22, RR23, RR24 |
| ... | | ... | ... |
| 8.8.0.0/16 | 16 | nh-2 | RR2, RR3, RR5, RR7, RR8 |
| 8.8.0.0/16 | 16 | nh-12 | RR12, RR13, RR15, RR17, RR18 |
| 8.8.0.0/16 | 16 | nh-22 | RR22, RR23, RR25, RR29 |
| ... | | ... | ... |
| 8.0.0.0/12 | 12 | nh-3 | RR1, RR4, RR5, RR7 |
| 8.0.0.0/12 | 12 | nh-13 | RR11, RR14, RR15, RR17 |
| 8.0.0.0/12 | 12 | nh-23 | RR21, RR24, RR25, RR27 |
| ... | | ... | ... |
| 8.0.0.0/9 | 9 | nh-1 | RR1, RR2, RR3, RR4 |
| 8.0.0.0/9 | 9 | nh-11 | RR11, RR12, RR13, RR14 |
| 8.0.0.0/9 | 9 | nh-21 | RR21, RR22, RR23, RR24 |
| ... | | ... | ... |
| 8.0.0.0/8 | 8 | nh-2 | RR2, RR3, RR5, RR7, RR8 |
| 8.0.0.0/8 | 8 | nh-12 | RR12, RR13, RR15, RR17, RR18 |
| ... | | ... | ... |

FIG. 7

METHODS AND APPARATUS FOR EFFICIENT STORAGE AND QUERYING OF COMMUNICATION NETWORK PARAMETERS

FIELD OF THE INVENTION

This disclosure pertains to computer-assisted methods, apparatus, and systems for efficiently monitoring and storing the state of large-scale communication networks and tracing packet routes through such networks.

BACKGROUND

Currently, the Internet comprises about one million IPV4 nodes, each node having a "prefix", i.e., an Internet Protocol (IP) address (or portion of an address). (The Internet also has IPv6 destinations, IPv6 having been developed to, inter alia, address the IPV4 address exhaustion problem, and both protocols currently coexist on the internet.) Furthermore, a large scale Internet Service Provider (ISP) serving millions of customers located in a multitude of different countries and continents may maintain upwards of several thousand Provider Edge routers (PEs) located all over the world.

To generally provide its customers fast, smooth, and error-free access to the Internet, such ISPs must monitor the condition of their networks continuously to assure proper operation, detect and remedy failed nodes, detect traffic conditions and reroute traffic as needed to alleviate high traffic conditions, etc.

Part of this process of maintaining and monitoring a communication network is to maintain a routing table (or Routing Information Base; RIB, for short). Particularly, in a mesh network, such as the Internet, a routing table is developed over a period of time that dictates how any given packet will be routed through the network from any given source node to any given destination node. More particularly, to build the RIB, the nodes of the network exchange control plane messages (layer 1, 2, and/or 3 messages, such as prefix advertisement and discovery messages, etc.) whereby the nodes, over time, determine the complete topology of the network, including, for instance, which nodes are directly couple to which other nodes and the cost of each connection between adjacent nodes. Some well-known protocols for advertisement and discovery of network topology data include OSPF (Open Shortest Path First) protocol, ISIS (Intermediate System to Intermediate System) protocol, and BGP (Border Gateway Protocol). The vast majority of all current networks use one or more of these three protocols. Typically, each node first exchanges messages to determine the nodes to which it is directly coupled (i.e., via one hop). Then the various nodes of the network exchange that information with additional nodes until every node in the network has a complete picture of the topology of the network.

FIG. 1 shows a graphical representation of an exemplary network topology 10. It shows every node in the network as well as the links between the nodes and the cost of each link. In this simple example, there are 11 nodes, namely, nodes A through K. Each arrowed line represents a direct communication link between two nodes (i.e., two nodes that can communicate directly with one another without using an intermediate node, sometimes referred to as adjacent nodes). The arrows indicate the directions of the links, and the number in the middle of each line represents the relative cost of the link.

Once the network topology is mapped and known by each node, each node can build a Routing Information Base which dictates to which other network node the node should transmit a data packet to an intended destination address. The data packet may be either generated at the node (e.g., at one of the computing devices coupled to the node) or received from another node for relay to yet another node. Particularly, each data packet typically includes within the packet a destination address (i.e., the identity of the destination node and/or device). The node determines the nexthop for the packet (i.e., the next node to which it should transmit the packet) based on the RIB and the destination address.

The RIB is largely based on the network topology (including the interconnectivity of the network nodes and the cost associated with each hop). Various algorithms are known for building routing tables. One such algorithm is Dijkstra's Shortest-Path-First algorithm, for instance. This particular algorithm attempts to determine the best route through the network from a given source node to a given destination node based primarily on a combination of the shortest path from the source node to the destination node and the lowest cost. In addition to the network topology, the exact route that a packet takes through the network may also be dependent upon the content of the packet. For instance, video data may be sent along a different path than a short message or high priority data may travel along a different path than lower priority data. Thus, in some cases, the RIB may identify more than one potential path that the data may take through the network, and the ultimate path will be determined by information external of the RIB (e.g., the type of the data or the hardware configuration of the relevant router).

As new nodes are added or old nodes are removed from the network, update messages are exchanged so that all of the nodes can continuously update their picture of the network topology and their respective routing tables.

Referring again to the network topology diagram of FIG. 1, it also demonstrates a route, represented by the dashed line 12 dictated by the RIB for data originating at a first, source device 14 (e.g., a cellular telephone) that connects to the network via network node A and a second, destination device 16 (e.g., a server) that is connected to the network via node K. As can be seen, using an algorithm such as the aforementioned Dijkstras algorithm, the RIB dictates a path that goes from node A to node D, then from node D to node E, then from node E to node F, and, finally, from node F to node K.

Effectively monitoring a large-scale nationwide ISP's network poses significant challenges, particularly in maintaining the RIB of thousands of PE routers. As alluded to above, the dynamic nature of the routing state, influenced by a user's location in reaching global Internet destinations, results in each PE's RIB holding a prefix pointing to a distinct nexthop as a function of the destination address of the data packet. Given the expansive size of the current Internet routing table, approximately 1 million prefixes, and assuming 5000 PEs within a major ISP, the task of maintaining and monitoring the RIB for a large-scale ISP's network involves monitoring a staggering 5 billion prefixes to capture the network's instantaneous perspective.

SUMMARY

In an embodiment, a method of storing network topology data of a network employing Route Reflectors (RRs) in an electronic memory comprises obtaining the Routing Information Base (RIB) of each RR in the network, each RIB comprising a list of entries, each entry correlating an electronic address prefix and an ingress router in the network to a best nexthop to an egress router in the network as a function of the prefix and the ingress router, using the data in the RIBs of the RRs to determine, each unique prefix and nexthop tuple appearing in an entry listed in the RIBs, determining for each of the unique prefix and nexthop tuples every RR in the network that includes an entry comprising that tuple, generating a list comprising an entry for each unique prefix and nexthop tuple correlating that unique prefix and nexthop tuple to a list of all RRs including an entry comprising that tuple, and storing the generated list in an electronic memory.

In another embodiment, a method of determining a path that a data packet would have taken through a communication network employing Route Reflectors (RRs) at a particular time as a function of a source node of the data packet in the network and a destination address for the packet in the communication network comprises obtaining the Routing Information Base (RIB) of each RR in the network at the particular time, each RIB comprising a list of entries, each entry correlating an electronic address prefix and an ingress router in the network to a best nexthop to an egress router in the network as a function of the prefix and the ingress router, using the data in the RIBs of the RRs to determine, each unique prefix and nexthop tuple appearing in an entry listed in the RIBs, determining for each of the unique prefix and nexthop tuples every RR in the network that includes an entry comprising that tuple, generating a first list comprising an entry for each unique prefix and nexthop tuple correlating that unique prefix and nexthop tuple to a list of all RRs including an entry comprising that tuple, storing the first list in an electronic memory, maintaining a second list of node to RR mappings for the network, the list disclosing every RR that contains a Routing Information Base (RIB) for each node, maintaining a third list of address prefixes accessible via the network, determining any one or more RRs that the source node is mapped to in the second list, generating a fourth list comprising all prefixes in the third list that are consistent with the destination address, generating a fifth list comprising all entries in the first list having any of the prefixes in the fourth list, selecting the entry in the fifth list that comprises the longest prefix and includes an RR to which the source node is mapped, and determining a nexthop for the data packet to be the nexthop contained in the selected entry of the fifth list.

In yet another embodiment, a computer-readable device comprises non-transitory instructions, which, when executed by a processor, cause the processor to perform the operations of obtaining the Routing Information Base (RIB) of each RR in the network, each RIB comprising a list of entries, each entry correlating an electronic address prefix and an ingress router in the network to a best nexthop to an egress router in the network as a function of the prefix and the ingress router, using the data in the RIBS of the RRs to determine, each unique prefix and nexthop tuple appearing in an entry listed in the RIBs, determine for each of the unique prefix and nexthop tuples every RR in the network that includes an entry comprising that tuple, generate a list comprising an entry for each unique prefix and nexthop tuple correlating that unique prefix and nexthop tuple to a list of all RRs including an entry comprising that tuple, and storing the generated list in an electronic memory.

In yet one more embodiment, a computer-readable device comprises non-transitory instructions, which, when executed by a processor, cause the processor to perform the operations of obtaining the Routing Information Base (RIB) of each RR in the network at the particular time, each RIB comprising a list of entries, each entry correlating an electronic address prefix and an ingress router in the network to a best nexthop to an egress router in the network as a function of the prefix and the ingress router, using the data in the RIBs of the RRs to determine, each unique prefix and nexthop tuple appearing in an entry listed in the RIBs, determining for each of the unique prefix and nexthop tuples every RR in the network that includes an entry comprising that tuple, generating a first list comprising an entry for each unique prefix and nexthop tuple correlating that unique prefix and nexthop tuple to a list of all RRs including an entry comprising that tuple, storing the first list in an electronic memory;

(f) maintaining a second list of node to RR mappings for the network, the list disclosing every RR that contains a Routing Information Base (RIB) for each node, maintaining a third list of address prefixes accessible via the network, determining any one or more RRs that the source node is mapped to in the second list, generating a fourth list comprising all prefixes in the third list that are consistent with the destination address, generating a fifth list comprising all entries in the first list having any of the prefixes in the fourth list, selecting the entry in the fifth list that comprises the longest prefix and includes an RR to which the source node is mapped, and determining a nexthop for the data packet to be the nexthop contained in the selected entry of the fifth list.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") indicate like elements.

FIG. 6 is a table showing the results of a table lookup for prefix matches in accordance with an embodiment; and FIG. 7 is a table showing the entries in the table of FIG. 6 re-sorted by matching prefix length.

DETAILED DESCRIPTION

Figure 1:
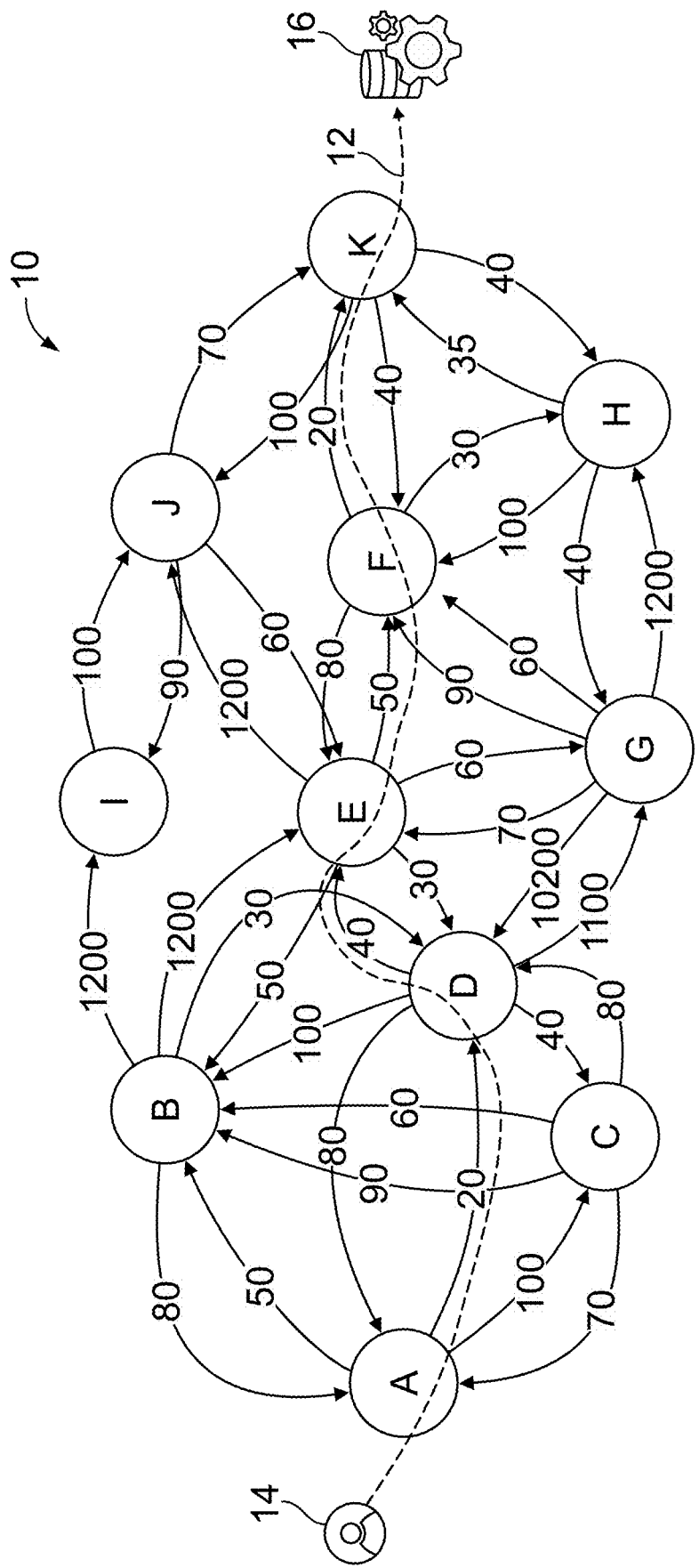
FIG. 1 is a diagram illustrating an exemplary network topology and packet route through the network.

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components, and circuits have not been described in detail, so as not to obfuscate the following description. Further, embodiments and examples not specifically described herein may be practiced in lieu of, or in combination with, the embodiments and other examples described, disclosed, or otherwise provided explicitly, implicitly, and/or inherently (collectively "provided") herein.

Communication networks provide data connectivity between any two nodes of the network. Many communication networks provide connectivity between two or more additional networks (and all the devices connected to those additional networks). For instance, an Internet Service Provider (ISP) provides connectivity between its customers computing devices, such as computers, cellular telephones, game consoles, wearable computing devices, etc. and the Internet (and all of the other networks connected to the Internet).

When one computing device, e.g., Device A connected to network node A, wants to communicate with another computing device, e.g., Device B connected to network node B, it is rare that the two nodes are in direct communication with each other. More commonly, the message is relayed from Node A of the network to Node B of the network through one or more other "relay" nodes. In fact, this relay paradigm is fundamental to the concept of mesh networks, such as the Internet (and many of the private and public networks connected to the Internet).

Thus, for example, when a customer of an ISP wishes to send data through the Internet to another entity (for purposes of example, let us assume it is a request to view a webpage), the customer interacts with an electronic device (for purposes of example, let us assume it is a laptop computer), which generates a message to be transmitted to the URL (i.e., destination address) of the webpage. That message, which may comprise one or more distinct data packets, is transmitted from the user's device to a node of the ISP's network to which the user's device is connected, herein referred to as the entry node, source node, or ingress edge router). If that ingress PE router is not the best edge router of the ISP's network for reaching the destination address, then the message will be transmitted from that ingress router to another edge router (PE) of the ISP's network (possibly via one or more intermediate nodes in the ISP's network). From that PE (sometimes referred to herein as the egress PE of the ISP's network), the message is routed through one or more nodes of the Internet to a PE of a network another ISP that is hosting the requested webpage (the ingress PE of that second ISP's network). If the webpage server is not connected directly to that ingress PE, then, from there, it will be routed from that ingress PE through one or more nodes of that second ISP's network to the node to which the webpage owner's web server is connected (sometimes referred to herein as the destination node).

Within each packet is a field identifying the address of the destination device/server (often referred to herein as a prefix). The prefix is a number that typically comprises a first portion identifying the address/prefix of the destination PE, a second portion identifying the address/prefix of the destination node, and third portion identifying the address/prefix of the destination device/server.

As previously noted, each node of each network (including the edge routers/PEs and the intermediate nodes in the Internet and the ISPs' networks) will parse the prefix in the message and look up the parsed prefix in its RIB. As previously noted, for every prefix, the RIB will identify a nexthop (the next node to which the message should be forwarded) to get to the destination address, and that node will forward the message to the identified node. This will happen at each node in the path from the source device to the destination device until the message is received at the destination device.

The routing within a given network (e.g., the first ISP's network) is typically handled separately from the routing from that particular network (from the edge routers of that particular network) over the Internet. For instance, the internal routing within the ISP's network from the ingress router to the egress edge router may be accomplished using distinct internal routing tables from the ones discussed below, and possibly even using different routing algorithms.

The following discussion primarily concerns determining the best egress PE from the ISP's network out to the Internet for a given destination address. Thus, in the following discussion, except as otherwise noted, the term "nexthop" is used to refer to the egress router of the ISP's network selected for routing a message/packet to an address external to the ISP's network. Although largely not addressed in the following discussion, it should be understood that, in fact, a message/packet may have to be routed through several intermediate nodes within the ISP's network to get from the ingress router to the egress router, and that routing is being handled separately from the routing from an ingress router to the nexthop egress router that is the primary subject of the following discussion.

Sometimes, a packet does not reach its destination. This may occur due to many possible reasons, including, for instance, one or more of the nodes in the packet path is not operating properly, one of the nodes in the packet path is overloaded and cannot handle all of the traffic passing through it and is dropping packets, electronic noise has caused one or more of the bits/symbols in the packet to be misinterpreted at one or more of the nodes, etc. Whatever the cause, the network operator (e.g., an ISP) typically wishes to identify the cause of such losses and remedy it, whether it be identifying a router in the packet's path that is not operating properly or is experiencing traffic overloaded, etc.

Thus, network operators often utilize diagnostic tools to attempt to determine and locate the cause of such problems.

U.S. patent application Ser. No. 18/434,963, owned by Selector Software, Inc., the applicant of the present patent application, and incorporated herein in full by reference, discloses one such diagnostic tool. Particularly, it discloses methods, apparatus, systems, and techniques for storing, maintaining, monitoring, and querying a database from which the status of a communication network, including the RIB for the entire network, can be determined and recreated for any given instance in time in the past (or at least as far back in time as the network operator cares to store such data). One use of such a system for historical analysis of a network is for determining and/or diagnosing the cause of detected network errors or performance degradations, such as the determining the identity of a faulty network node. More particularly, when one of the nodes of the network is faulty, it may prevent some messages in the network from reaching their intended destination nodes, thereby causing inconvenience (or worse) for users of the network. Since a modern large scale network could easily comprise thousands of nodes (typically comprising a plurality of smaller, heterogeneous topologies), when a message is not received properly at the destination node, it often an extremely challenging task to determine which node in the network is faulty and needs attention.

In order to identify a faulty node, operations teams employed by the network operator must examine the network topology and spot any inconsistencies along the paths from the source device to the destination device, and thereby determine which parts of the network need to be triaged in depth. To further complicate matters, often, network issues are reported hours, days or weeks after the problem was experienced and, often, are not replicable. Aforementioned U.S. patent application Ser. No. 18/434,963 makes the process of identifying a faulty node much easier.

U.S. patent application Ser. No. 18/600,223, also owned by Selector Software, Inc. and fully incorporated herein by reference, disclose methods, apparatus, systems, and techniques for storing, maintaining, monitoring, and querying a database from which the status of a communication network, including the RIB for the entire network, can be determined, and from which proposed future modifications to a network can be experimentally tested to forecast network operational parameters under such proposed modifications.

As described in both of the aforementioned patents application Ser. Nos. 18/434,963 and 18/600,223, the database must contain information from which network conditions, including the RIB for the entire network, can be recreated.

It should be apparent from the discussion above and in the background section of this specification that the amount of data required to be stored for a large-scale ISP for these purposes can be staggering (e.g., at any given instant in time, the RIB for such a network may comprise about five billion prefixes; and, at least for the U.S. patent application Ser. No. 18/434,963, that RIB is being continuously modified and must be stored for multiple instances in time).

To implement the route lookup necessary to trace the path of any given packet/message through the Internet for purposes of the diagnostics and/or predictive diagnostics discussed in the aforementioned patents application Ser. Nos. 18/434,963 and 18/600,223, one must know the full Internet routing table of the ingress-PE (comprising approximately one million Internet prefixes, with the RIB associating each prefix with the best nexthop (i.e., egress PE) from this ingress PE. For each ingress PE of a particular ISP, the same one million prefixes will have different nexthops (as the ISP will have implemented distinct routing policies or peering agreements to reach parts of the global Internet from different vantage points). It would not be uncommon for a large ISP to have thousands of ingress-PEs (~5000) globally (each PE being a highly sophisticated router designed to hold hyper-scale RIB data), and leverage custom hardware to implement route lookups in nanoseconds. This translates into having thousands of perspectives of the Internet RIB depending on where traffic enters or exits the ISP network, and, in a real network, this data is distributed and stored independently on highly performant routing elements. Thus, as previously mentioned, the number of entries in the cumulative RIBs of a large scale ISP having, for instance, 5000 PEs connected to the Internet (comprising approximately 1 million nodes) would be about 5 billion (5000×1,000,000).

For example, for the historical analysis process described in aforementioned U.S. patent application Ser. No. 18/434,963, snapshots of the 5 billion prefixes need to be stored for potential analysis at certain intervals, e.g., every 12 hours going back in time as far as the operator wishes to store such information for possible analysis. However, storing such a massive amount of data is impractical. For example, storing 5 billion RIB entries per each 12 hour snapshot for merely one week would comprise 70 billion (5 billion times 14) entries.

Thus, a system for efficiently storing such data is needed. In addition, an efficient technique is needed for querying a database storing such a staggering amount of data for, e.g., determining a particular route that a data packet travelled from a particular source node to a particular destination node within a network (or may travel in the future) since such a database would have limited utility unless a query to determine a packet route could be both entered and then resolved quickly.

Storage Optimization

Route Reflectors (RRs) are routers within a network that reflect routes learned from BGP peer routers. Particularly, a RR may be assigned a plurality of peer routers (e.g., PEs) for which it is responsible for maintaining the RIB information. More specifically, all of the peer PEs assigned to a given RR form a peering relationship with only that RR, rather than with each other to build their RIBs. Thus, that RR contains routing information for all of its peer PEs, and each of those peer PEs can build its own RIB from the information that it obtains from its associated RR. Note that, often, in such schemes, a PE may be assigned to multiple RRs for redundancy and/or other purposes.

Figure 2:
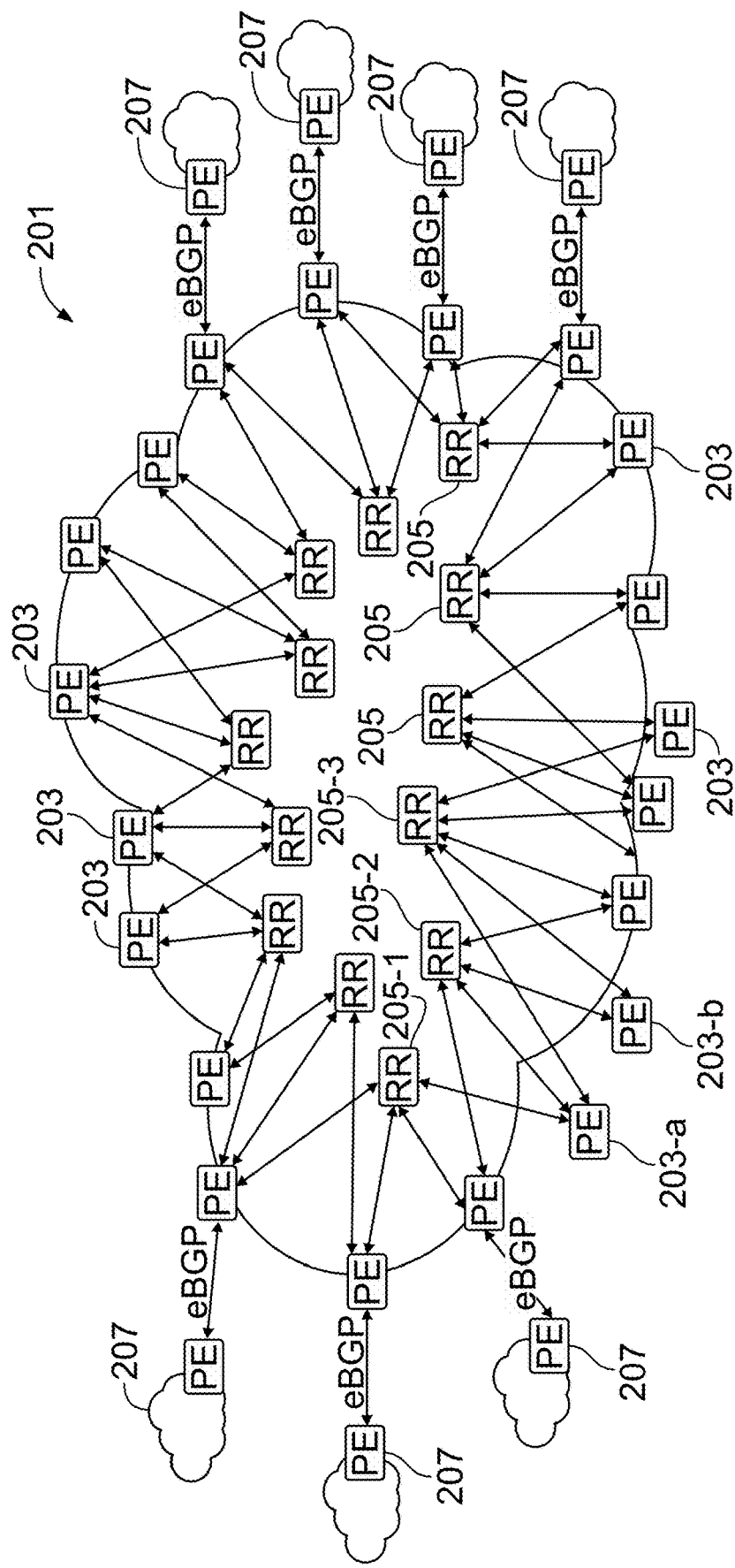
FIG. 2 is a diagram illustrating an exemplary communication network employing reflector routers.

FIG. 2 illustrates the concept of RRs. In this example, an ISP's network 201 comprises 20 PE routers 203 plus 13 RRs 205 (note that not all of the PEs and RRs are labelled with their respective reference numbers in order not to obfuscate the drawing with too many reference numerals). Each RR 205 peers with a set of PEs 203. In this example, each RR 205 peers with two, three, four, or five PEs, depending on the particular RR. The group of PEs that communicate with any given single RR is herein called the peer group of that RR. Each PE 203, being an edge router, is coupled to at least one PE router 207 of another network (e.g., the Internet). In the example of FIG. 2, each PE is a member of anywhere from 2 to 4 RR peer groups.

Thus, instead of N PE routers 203 establishing a full mesh of sessions with N-1 other routers in the network (where N is an integer representing the total number of routers in the ISP's network), each PE 203 establishes a session to exchange routing information only with the one or more RRs to which it is assigned (i.e., of which it is a member of that RR's peer group).

In a large-scale ISP network, there might be hundreds of RRs 205, each serving a geographical area as determined by the operator. Each RR 205 peers with several PE routers 203 to learn Internet prefixes reachable from those PEs and resolves the best nexthop PE 207 for each prefix. It then reflects these routes to all the PEs 203 that are in that RR's peer group.

Thus, it can be surmised that, in a network utilizing RRs, the number of perspectives is proportional to the number of RRs in the ISP's network, rather than the number of PEs in the ISP's network. Hence, for instance, if we assume an ISP network with 5000 PEs connected to 800 RRs, the total number of prefixes that must be stored for each instance in time, i.e., each "snapshot", is reduced from 5 billion (5,000 PEs*1 million Internet prefixes) to 800 million (800 RRs*1 M Internet prefixes).

However, 800 million entries per snapshot is still an enormous number of entries to save multiple times per day over several days, weeks, or months.

The number of entries that must be stored may be further reduced by about two orders of magnitude by leveraging the knowledge that the total number of unique nexthops is proportional to the number of PE routers in the network (e.g., an ISP's network), as each PE learns prefixes from an external peer to carry traffic to these prefixes out of the ISP network.

As previously mentioned, each PE internally peers with a set of RRs to exchange its prefixes with the RRs. For instance, PE 203-*a* in FIG. 2 is part of three RR peer groups, namely, the peer groups of RR 205-1, RR 205-2, and RR 205-3, whereas PE 203-*b* is part of two RR peer groups, namely, the peer groups of RR 205-2 and RR 205-3. Each of these RRs 205 further reflects this data to the other PEs in that RR's peering group and vice-versa.

When all of the exchanges of nexthop information are completed, each PE 203 is determined to be the best nexthop for a set of Internet prefixes by one or more RRs. In the specific exemplary network of FIG. 2, for instance, each PE is determined to be the best nexthop for a set of internet prefixes in the RIBs of two, three, or four different RRs. Note that, in a typical ISP's network, many of the RRs that have common PEs in their peer groups are likely to be collocated.

From the above, it may be surmised that each {prefix, nexthop} tuple is shared by a set of RRs. Thus, by reorganizing the data to store a list of RRs per {prefix, nexthop} tuple, rather than a list of nexthops per {RR, prefix} tuple, the total number of entries that must be stored can be significantly further reduced. Thus, instead of storing about 800 million {RR, prefix} tuples→[nexthop] entries, one can store, without the loss of any routing data; about 8 million {prefix, nexthop} tuples→[list of RRs] entries.

Figure 3:
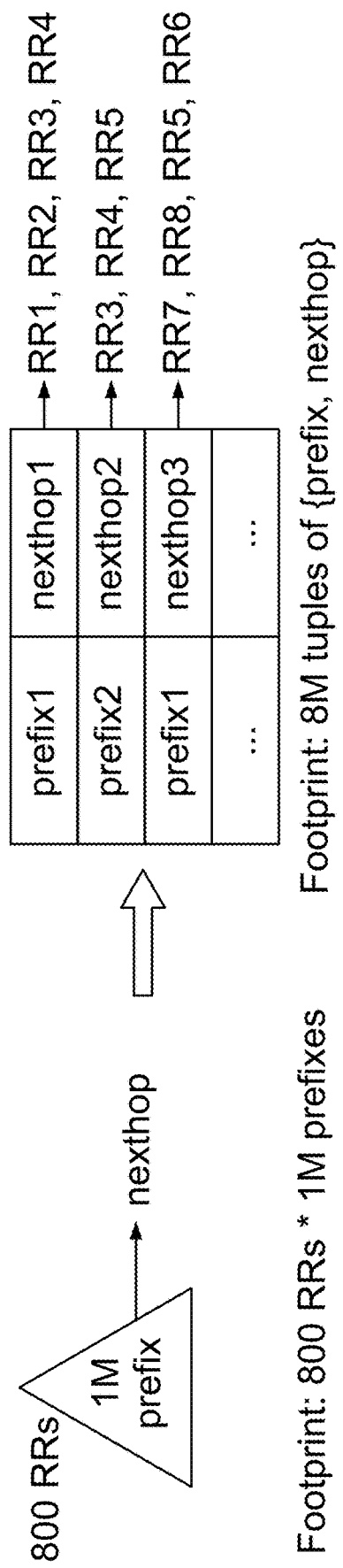
FIG. 3 is a graphical illustration showing a comparison of a prior art technique for storing routing information and a technique for storing routing information in accordance with embodiments.

The difference between the two storage paradigms is illustrated by FIG. 3.

The exact proportion by which the storage footprint is reduced will depend on how many external prefixes, on average, are learned from each PE in the network. Particularly, for instance, continuing with the example of an ISP network having 5,000 PE's and the Internet having 1 million prefixes, ideally, each PE, on average, learns one five thousandths of the one million Internet prefixes from peer PEs (i.e., 200 prefixes per PE since 1 million/5,000=200). Ideally, this would mean that there are only 5,000 (nexthops) *200 (prefixes)=1 million {prefix, nexthop} tuples to store (i.e., 1 million entries in the table, each entry comprising a {prefix, nexthop} tuple and its associated [list of RRs], which would mean an 800-fold reduction in number of entries. However, in the real world, some prefixes are reachable via more than one PE. Thus, a more realistic reduction is from about 800 million entries to about 8 million entries (essentially meaning that, on average, each prefix is reachable from 8 of the ISP's 5000 PEs), which is still a 100-fold reduction without any loss of routing information.

In operation, the RRs would determine which one of the multiple possible nexthops (which, in this context, means which one of the ISP's PEs) is the best nexthop for the relevant geographical region, and reflect the resolved routes to the internal (to the ISP's' network) PEs.

Route Lookup Performance Optimization

In the context of aforementioned U.S. patent application Ser. No. 18/434,963, for instance, to look up a route that a data packet would have taken through the network at any given instant would require, inter alia, determining the most recent "snapshot" preceding the time of interest, and utilizing the RIB of that snapshot to reconstruct the path that the packet would have taken through the ISP's network at that instant in time.

If the data in the snapshot were organized in the traditional format of {RR, prefix}→nexthop, it would be straightforward to index the data by RR, load the Internet RIB per RR, perform LPM on that RIB to find the best match for each hop through the network, and string all the nexthops together to reconstruct the path that the packet would have taken through the network. However, as noted above, this would require storing about 800 Million entries per snapshot, which is an impractical amount to data to store.

Internet prefixes are a well-known set of about 1 million prefixes. In an embodiment, this knowledge is leveraged to implement a variant of LPM that works extremely efficiently with a table organized as described above, i.e., {prefix, nexthop}→[list of RRs], allowing for determining a nexthop of a packet in nanoseconds, rather than minutes.

Particularly, as is well-known, when customer data enters the ISP network, the ingress-PE performs a longest prefix match (LPM) of the destination address with its Internet RIB to find the most specific route, and uses the corresponding nexthop to forward the data toward the destination.

In accordance with an embodiment, the process of determining each nexthop to reconstruct the path that a packet would have taken through the network starts with the user, e.g., a network analyst, inputting a query to lookup a destination-ip-address (DIP) from an ingress-PE point-of-view, in a specific time period, e.g., between times t1 and t2, as described in more detail in the aforementioned patents application Ser. Nos. 18/434,963 and 18/600,223. In this example, t1 may be the time of the snapshot immediately preceding a particular instant in time that the analyst is most interested in and t2 may be the time of the snapshot immediately succeeding that particular instant in time.

The monitoring tool loads the Internet RIB for that ingress-PE from the snapshot taken at time t1 and performs a search to find the longest prefix match for the DIP to find the correct nexthop (egress-PE) to reach the destination address in seconds, as will be described in detail below.

Particularly, the monitoring tool maintains a table of PE to RR mappings, where the RR has resolved the best Internet RIB for each PE. This is essentially a list of the RRs of which each PE is in that RR's peer group, as discussed previously in connection with FIG. 2. This may be determined by the ISP operator and provided as a metadata for the network. Remember that any given PE may map to multiple RRs. In fact, in the specific example network of FIG. 2, each PE is mapped to at least two RRs, and some are mapped to as many as 4 RRs.

The monitoring tool further maintains an in-memory table of the well-known Internet prefixes, called Global Internet Prefixes (GIP). This table is not tied to any particular snapshot, but is the steady state of an Internet prefix list, without the notion of nexthops or RRs. Of course, however, whenever nodes are added or removed from the Internet, this table should be updated accordingly.

Figure 4:
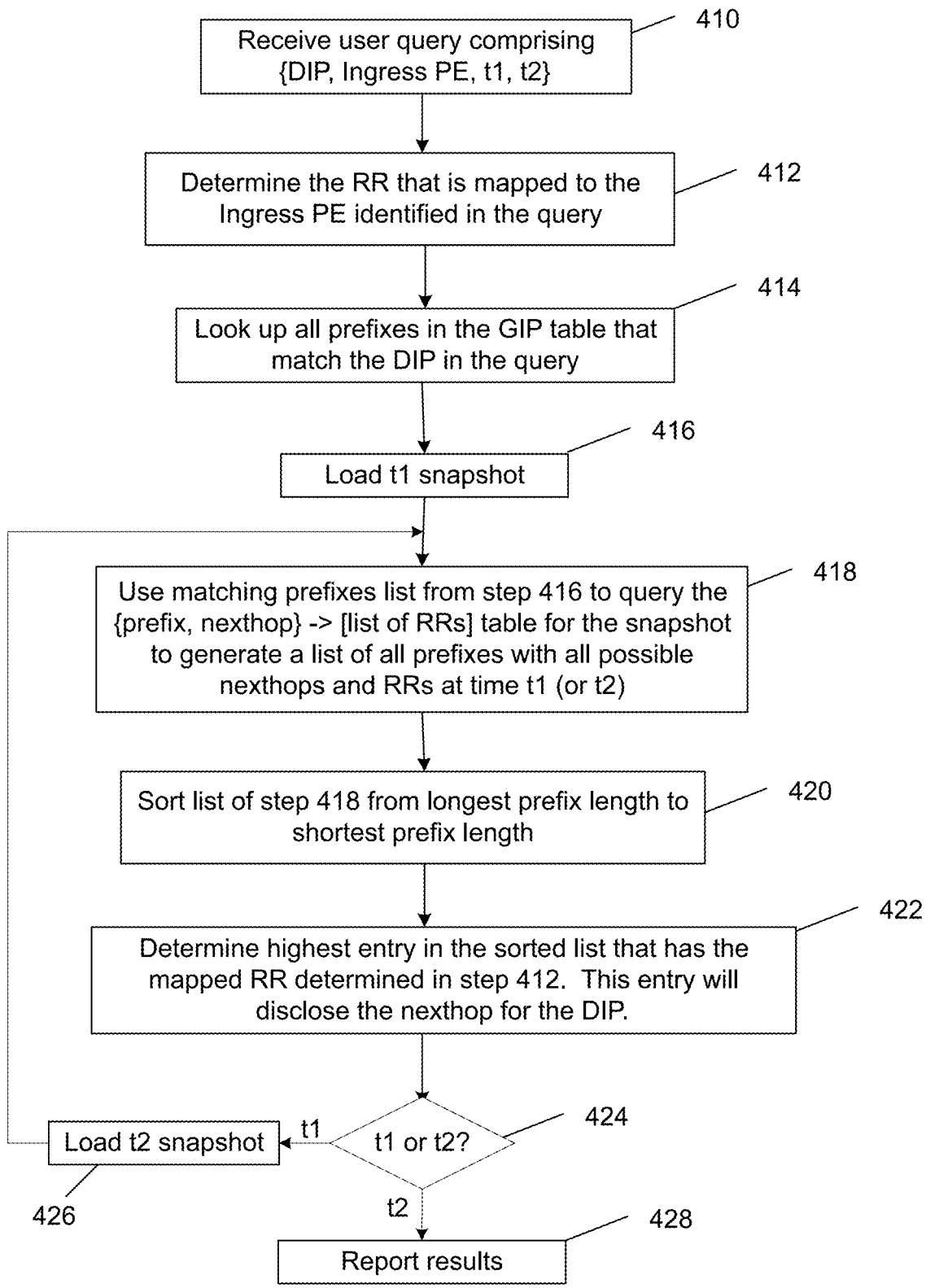
FIG. 4 is a flowchart illustrating operation of a network monitoring tool in accordance with embodiments.

With the above-noted available tables and the data in the query, an efficient route lookup algorithm will now be described in detail with reference to the flowchart of FIG. 4.

First, in step 410, the tool receives an input query asking to reconstruct the route that a packet would have traversed through the network at a given time. The query should include at least the ingress PE of the packet, the DIP for the packet, and the times t1 and t2 corresponding to the most immediately preceding snapshot to the time of interest and the most immediately succeeding snapshot to the time of interest. In other exemplary embodiments, the user may be allowed to simply input the time of interest and the tool determines the most immediately preceding and most immediately succeeding snapshots on its own.

Then, in step 412, the tool takes the ingress PE identified in the query and inputs it to the PE to RR mapping table to determine which RR(s) the ingress PE is mapped to. If the PE is mapped to more than one RR, any one of those RRs may be selected insofar as each of those RRs should have identical information.

Figure 5:
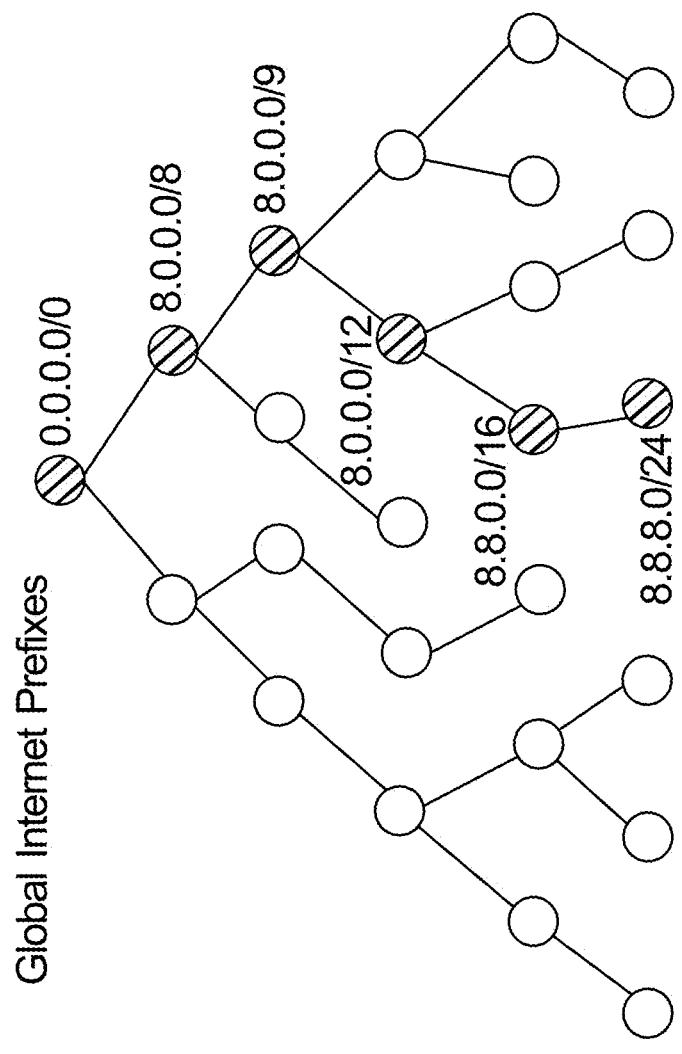
FIG. 5 is a graphical representation of at least a portion of the information that may be stored in a GIP table in accordance with embodiments.

Next, in step 414, the tool takes the DIP address found in the query and inputs it into the aforementioned GIP table of Internet prefixes to look up all matching prefixes in the GIP table. Note that this step is not limited to looking only for the longest match, but for all prefix matches for the DIP address. Thus, this search will result in a list of prefixes matching the DIP address. FIG. 5 is a graphical representation of at least a portion of the information stored in the GIP table that helps illustrate this concept. The information is not necessarily stored in this form, but FIG. 5 illustrates the fact that the Internet prefixes are organized in a binary tree-type structure, and that all matching prefixes for any given DIP will appear in a single continuous leg of the tree. That is, all of the matching prefixes will be in the same path between the top level of the tree, prefix 0.0.0.0/0, and the lowest level (commonly referred to at the leaf level), prefix 8.8.8.0/24. For instance, the DIP is Google IP, e.g., 8.8.8.1, and it results in six prefix matches, such as illustrated in FIG. 5. Also note that the number appearing after the slash in the prefix is the length of the prefix.

Next, in step 416, the tool loads the t1 snapshot.

Then, in step 418, the tool takes the list of all matching prefixes from the GIP table to query the {prefix, nexthop}→ [list of RRs] table of the time t1 snapshot to find each entry having any one of the 6 matching prefixes determined in step 414. This will result in a list such as illustrated in FIG. 6 of all prefixes with all possible nexthops and their corresponding RRs at time t1.

Next, in step 420, the tool re-sorts the list of FIG. 6 from longest prefix length to shortest prefix length, resulting in a list such as illustrated in FIG. 7. In embodiments, the entries in the list having prefixes of equivalent length may be ordered randomly. Alternately, they may be ordered according to some additional factor(s) or policy (ies), such as by using any of several well-known prefix selection techniques commonly used in routing decisions.

Then, in step 422, the tool determines the highest entry in the sorted list of FIG. 7 that includes the mapped RR determined in step 412. This entry will disclose the correct nexthop for a data packet at the ingress PE addressed to the DIP at time t1.

Using the list of FIG. 7 as an example, let us consider some exemplary cases for illustrative purposes. If the mapped RR determined in step 422 is RR11, the tool will select the second row from the sorted table of FIG. 7, and declare 'nh-11' to be the desired egress-PE for the DIP in the query. If, on the other hand, the mapped RR is determined in step 422 to be RR23, the tool will select the third row from the list of FIG. 7, which indicates that the correct nexthop is 'nh-21'.

If the mapped RR is not present in the entries with longest prefix length, which is 24 in this example, it means that this snapshot does not have the longest prefix due to a route withdrawal event. In this case, the tool will use the next longest match which is 8.8.0.0/16 prefix and find the RR sequentially.

If there is no matching entry for the mapped RR, then the tool will declare there is no match for the DIP lookup.

The process of steps 418-422 may then be repeated using the snapshots for time t2 to determine the route that a packet would have taken through the ISP's network at time t2. Thus, in decision step 424, if the process was just performed for the t1 snapshot, flow proceeds to step 426, in which the t1 snapshot is replaced with the t2 snapshot and flow returns to step 418 to repeat steps 418-422 with the t2 snapshot. If, on the other hand, it is determined in step 424 that the process has already been performed for both times t1 and t2, flow instead proceeds from step 424 to step 428, wherein the determined nexthop for time t21 and the determined nexthop for time t2 are reported to the user.

This gives the user the route a packet would have traversed through the ISP's network at time t1 and at time t2. The routes may be the same if no changes occurred in the network topology between times t1 and t2, or they may be different if changes did occur between times t1 and t2.

CONCLUSION

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs).

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), quantum computer, and/or a state machine.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

Moreover, the claims should not be read as limited to the provided order or elements unless stated to that effect. In addition, use of the terms "means for" in any claim is intended to invoke 35 U.S.C. § 112, 16 or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

The invention claimed is:

1. A method of storing network topology data of a communication network employing Route Reflectors (RRs) in an electronic memory, the method comprising:
   a. obtaining a Routing Information Base (RIB) of each RR in the communication network, each RIB comprising a list of entries, each entry correlating an electronic address prefix and an ingress router in the communication network to a best nexthop to an egress router in the communication network as a function of the prefix and the ingress router;
   b. using the data in the RIBs of the RRs to determine each unique prefix and nexthop tuple appearing in the entries listed in the RIBs;
   c. determining for each of the unique prefix and nexthop tuples every RR in the communication network that includes an entry comprising that tuple;
   d. generating a list comprising an entry for each unique prefix and nexthop tuple correlating that unique prefix and nexthop tuple to a list of all RRs including an entry comprising that tuple; and
   e. storing the generated list in an electronic memory.

2. The method of claim 1 comprising performing steps a-d on multiple occasions, each occasion using the RIBs corresponding to a different time instant.

3. The method of claim 2 wherein the multiple time instants are periodic.

4. A method of determining a path that a data packet would have taken through a communication network employing Route Reflectors (RRs) at a particular time as a function of a source node of the data packet in the communication network and a destination address for the packet in the communication network, the method comprising:

(a) obtaining a Routing Information Base (RIB) of each RR in the communication network at the particular time, each RIB comprising a list of entries, each entry correlating an electronic address prefix and an ingress router in the communication network to a best nexthop to an egress router in the communication network as a function of the prefix and the ingress router;

(b) using the data in the RIBs of the RRs to determine, each unique prefix and nexthop tuple appearing in the entries listed in the RIBs;

(c) determining for each of the unique prefix and nexthop tuples every RR in the communication network that includes an entry comprising that tuple;

(d) generating a first list comprising an entry for each unique prefix and nexthop tuple correlating that unique prefix and nexthop tuple to a list of all RRs including an entry comprising that tuple;

(e) storing the first list in an electronic memory;

(f) maintaining a second list of node to RR mappings for the communication network, the list disclosing every RR that contains a RIB for each node;

(g) maintaining a third list of address prefixes accessible via the communication network;

(h) determining any one or more RRs that the source node is mapped to in the second list;

(i) generating a fourth list comprising all prefixes in the third list that are consistent with the destination address;

(j) generating a fifth list comprising all entries in the first list having any of the prefixes in the fourth list;

(k) selecting the entry in the fifth list that comprises the longest prefix and includes an RR to which the source node is mapped; and (l) determining a nexthop for the data packet to be the nexthop contained in the selected entry of the fifth list.

5. The method of claim 4 wherein step (k) further comprises ordering the fifth list according to a length of the prefixes of the entries in the fifth list from longest prefix to shortest prefix.

6. The method of claim 5 wherein step (k) comprises selecting the highest entry in the fifth list that includes an RR to which the source node is mapped.

7. The method of claim 4 wherein the communication network is connected to the Internet and the wherein the source node is an ingress edge router of the communication network, the destination address is an address accessible via the Internet, the third list is a list of Global Internet Prefixes (GIP), and the nexthop is an egress edge router of the communication network.

8. The method of claim 4 further comprising performing steps a-e on multiple occasions, each occasion using the RIBs corresponding to a different time instant, whereby multiple first lists are stored corresponding to the different time instants.

9. The method of claim 8 wherein the particular time does not correspond to one of the time instants, the method comprising:

performing steps (f)-(l) using a one of the first lists corresponding to a time instance that most immediately precedes the particular time; and performing steps (f)-(l) using a one the first lists corresponding to a time instance that most immediately succeeds the particular time.

10. A computer-readable device comprising non-transitory instructions, which, when executed by a processor, cause the processor to perform operations, the operations comprising:

(a) obtaining a Routing Information Base (RIB) of each RR in a communication network, each RIB comprising a list of entries, each entry correlating an electronic address prefix and an ingress router in the communication network to a best nexthop to an egress router in the communication network as a function of the prefix and the ingress router;

(b) using the data in the RIBS of the RRs to determine, each unique prefix and nexthop tuple appearing in the entries listed in the RIBs;

(c) determining for each of the unique prefix and nexthop tuples every RR in the communication network that includes an entry comprising that tuple;

(d) generating a list comprising an entry for each unique prefix and nexthop tuple correlating that unique prefix and nexthop tuple to a list of all RRs including an entry comprising that tuple; and (e) storing the generated list in an electronic memory.

11. The computer-readable device of claim 10 wherein the operations further comprise performing steps a-e on multiple occasions, each occasion using the RIBs corresponding to a different time instance.

12. The computer-readable device of claim 11 wherein the multiple time instants are periodic.

13. A computer-readable device comprising non-transitory instructions, which, when executed by a processor, cause the processor to perform operations, the operations comprising:

(a) obtaining a Routing Information Base (RIB) of each RR in a communication network at a particular time, each RIB comprising a list of entries, each entry correlating an electronic address prefix and an ingress router in the communication network to a best nexthop to an egress router in the communication network as a function of the prefix and the ingress router;

(b) using the data in the RIBs of the RRs to determine, each unique prefix and nexthop tuple appearing in the entries listed in the RIBs;

(c) determining for each of the unique prefix and nexthop tuples every RR in the communication network that includes an entry comprising that tuple;

(d) generating a first list comprising an entry for each unique prefix and nexthop tuple correlating that unique prefix and nexthop tuple to a list of all RRs including an entry comprising that tuple;

(e) storing the first list in an electronic memory;

(f) maintaining a second list of node to RR mappings for the communication network, the list disclosing every RR that contains a RIB for each node;

(g) maintaining a third list of address prefixes accessible via the communication network;

(h) determining any one or more RRs that the source node is mapped to in the second list;

(i) generating a fourth list comprising all prefixes in the third list that are consistent with the destination address;

(j) generating a fifth list comprising all entries in the first list having any of the prefixes in the fourth list;

(k) selecting the entry in the fifth list that comprises the longest prefix and includes an RR to which the source node is mapped; and (l) determining a nexthop for the data packet to be the nexthop contained in the selected entry of the fifth list.

14. The computer-readable device of claim 13 wherein operation (k) further comprises ordering the fifth list according to a length of the prefixes of the entries in the fifth list from longest prefix to shortest prefix.

15. The computer-readable device of claim 14 wherein operation (k) comprises selecting the highest entry in the fifth list that includes an RR to which the source node is mapped.

16. The computer-readable device of claim 15 wherein the communication network is connected to the Internet and the wherein the source node is an ingress edge router of the communication network, the destination address is an address accessible via the Internet, the third list is a list of Global Internet Prefixes (GIP), and the nexthop is an egress edge router of the communication network.

17. The computer-readable device of claim 13 wherein the operations further comprises performing operations a-e on multiple occasions, each occasion using the RIBs corresponding to a different time instance, whereby multiple first lists are stored corresponding to the different time instants.

18. The computer-readable device of claim 17 wherein the particular time does not correspond to one of the time instants, the method comprising:

performing operations (f)-(l) using a one of the first lists corresponding to a time instance that most immediately precedes the particular time; and performing operations (f)-(l) using a one of the first lists corresponding to a time instance that most immediately succeeds the particular time.

\* \* \* \* \*